Aug. 27, 1929.　　　　E. C. HENRION　　　　1,725,799
THERMOSTATIC CONTROL
Original Filed Dec. 11, 1926
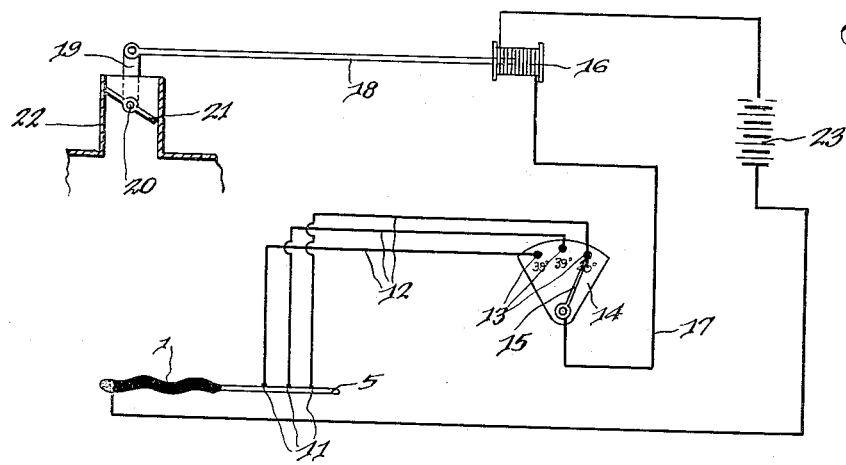
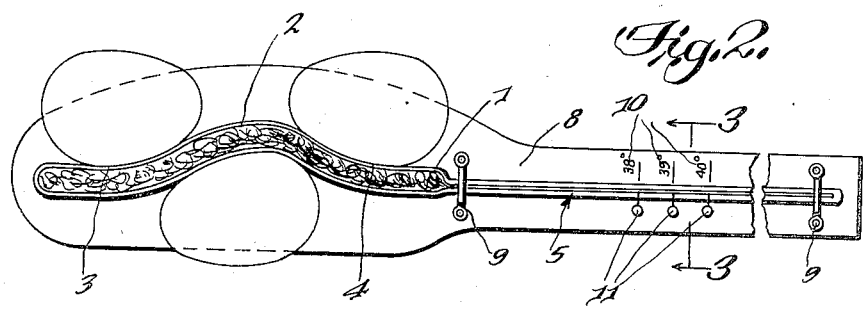
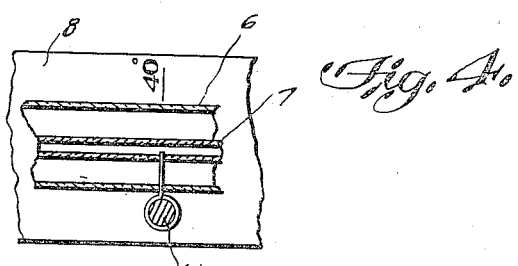
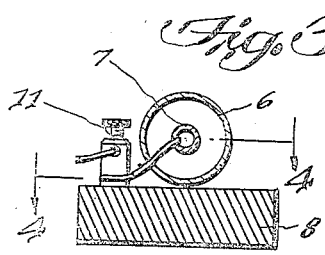
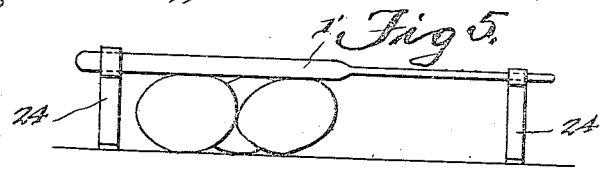
Eugene C. Henrion
INVENTOR
BY Arnold W. Ehrlich
ATTORNEY Patented Aug. 27, 1929.

1,725,799

UNITED STATES PATENT OFFICE.

EUGENE C. HENRION, OF CHICAGO, ILLINOIS.

THERMOSTATIC CONTROL.

Application filed December 11, 1926, Serial No. 154,274. Renewed March 12, 1929.

This invention relates to new and useful improvements in thermostatic control means and more particularly to a thermostatic control for use on incubators. The main object of the invention is the provision of a device of this character which is applied to an incubator for controlling the discharge of heated air therefrom so that should the temperature drop below the proper degree the outlet will be automatically closed and opened when the temperature rises above the proper degree.

Another object is to provide a device of the above character wherein the thermometer is placed in direct contact with the eggs in the incubator so that the temperature of the eggs will act directly on the mercury so that the degree of temperature of the eggs will act on the control for opening and closing the air discharge outlet to thus insure the fact that the eggs are retained at the proper temperature at all times.

Another object of the present invention is the provision of a device of the above character wherein the thermometer is electrically connected with a circuit maker and breaker in such manner that the rise and fall of the mercury therein will actuate a damper which controls the discharge of heat from the interior of the incubator thereby assisting in maintaining the proper temperature in the incubator at all times.

With the above and other objects in view the invention consists in the novel features of construction the combination and arrangement of parts hereinafter more fully set forth, pointed out in the claim and shown in the accompanying drawings in which;

Figure 1 is a diagrammatic view showing the application of my device and the manner of electrically connecting the parts.

Figure 2 is an elevation showing the manner in which the device is brought into direct contact with the eggs.

Figure 3 is a transverse section on the line 3—3 of Figure 2.

Figure 4 is a sectional view on the line 4—4 of Figure 3, and

Figure 5 is a side elevation illustrating another form of the invention.

In the drawings accompanying this description I have illustrated in Figure 1 the diagrammatic application of the device and before proceeding with the description of the construction and operation of the device I wish to call attention to the fact that in hatching eggs in an incubator it requires from 20 to 21 days' time and the eggs should be retained at an even degree of temperature for the 1st 18 days at least after which time the temperature may be dropped a degree or so a day until the eggs are hatched and in order to maintain the proper temperature within the incubator, proper regulation of the control member of the discharge outlet should be taken care of and with this end in view I will endeavor to point out in the accompanying drawings the construction and operation of the device.

The mercury barrel 1 of the thermometer used in my device is formed with a central curved portion 2 and lesser curved portions 3 and 4 upon opposite sides of the central portion whereby the same may be placed between and at the same time brought into direct contact with the eggs as shown in Figure 2, the curvature of the thermometer permitting the eggs to lie close together but in direct contact with the thermometer. The reduced stem 5 of the thermometer includes the outer casing 6 and the inner mercury tube 7 and is secured to a base plate 8 by means of the clips 9. The base plate is provided with registering degrees 10 and in alignment with each degree I place a contact member 11 which extends through the casing 6 and into the tube 7 in the path of the mercury as shown in Figure 4.

Each of the contact members 11 are connected by means of the line wires 12 with the contact points 13 on a base board 14 and mounted on this base board 14 is a pivoted contact member 15 whereby one end thereof can be brought into engagement with any one of the contacts 13 for completing a circuit through the solenoid 16 through line wire 17 which is connected to one end of contact member 15. The solenoid 16 has its core connected with a rod 18, the outer end of which is attached, to an arm 19 on the shaft 20 which supports the damper plate 21 for the outlet 22 of an incubator.

From the above it will be apparent that after setting the outer end of the member 15 on one of the contacts 13 and the mercury reaches the contact 11 connected with the contact 13 engaged by the member 15 a circuit will be completed to the solenoid 16 through battery 23. The solenoid 16 will be actuated to open the outlet 22 and as soon as the incubator has cooled sufficiently to cause the mercury to drop the circuit will be broken and the outlet closed through the action of the mercury.

In Figure 5 I have illustrated a slightly modified form of the invention wherein a straight barrel 1' for the thermometer is used and mounted upon spaced supports 24. In this form of the invention the thermometer will lie on top of the eggs but at the same time be in direct contact therewith.

While I have shown and described the preferred embodiment of my invention I wish it understood that various changes and alterations may be carried out in production of my device without departing from the spirit of the invention or the scope of the appended claim.

Claim—

In a thermostatic control for incubators, a mercury barrel formed with a central curved portion and lesser curved portions upon opposite sides of the central portion, whereby the same may be placed between and directly contact the eggs in the incubator.

In witness whereof, I hereunto subscribe my name this 24th day of July A. D., 1926.

EUGENE C. HENRION.